United States Patent [19]
Wilson

[11] Patent Number: 5,375,656
[45] Date of Patent: Dec. 27, 1994

[54] LOW FLOW RATE OIL SUPPLY SYSTEM FOR AN ELECTRIC SUBMERSIBLE PUMP

[75] Inventor: Brown L. Wilson, Tulsa, Okla.

[73] Assignee: Oil Dynamics, Inc., Tulsa, Okla.

[21] Appl. No.: 960,888

[22] Filed: Oct. 14, 1992

[51] Int. Cl.$^5$ ................................ F01M 1/00
[52] U.S. Cl. ........................ 166/67; 417/205; 184/26
[58] Field of Search ............ 184/8, 7.4, 26, 31; 166/67, 68, 68.5; 417/723.3, 205, 199.1, 254, 255; 62/470

[56] References Cited

U.S. PATENT DOCUMENTS

| | | | |
|---|---|---|---|
| 2,019,299 | 10/1935 | Fox | 184/7.4 |
| 2,046,769 | 7/1936 | Coberly | 166/68.5 |
| 2,307,662 | 1/1943 | Baylor | 166/67 |
| 2,713,908 | 7/1955 | Curtis | 166/67 |
| 2,748,893 | 6/1956 | Mueller | 184/7.4 |
| 3,101,117 | 8/1963 | Scott | 166/67 |
| 3,132,694 | 5/1964 | McGlasson | 166/67 |
| 3,360,958 | 1/1968 | Miner | 62/470 |
| 3,500,962 | 3/1970 | Kocher | 62/468 |
| 4,222,440 | 9/1980 | Parker | 166/68 |
| 4,345,668 | 8/1982 | Gaunt | 184/7.4 |

*Primary Examiner*—Richard A. Bertsch
*Assistant Examiner*—Peter Korytnyk
*Attorney, Agent, or Firm*—Head & Johnson

[57] ABSTRACT

An electric submersible pumping system uses a small diameter capillary tube and a high pressure injection pump. The tube size is selected so that the frictional flow resistance of the tubing at the desired flow volumes balances the pressure caused by the height difference in the columns of fluid. The flexibility of the system is expanded by tapering the capillary tubing string, preferably, but not necessarily, using a larger inner diameter tube above and a smaller inner diameter tube below. Using calculated lengths of different diameter tubing, the pressure loss due to flow can be adjusted to suit the anticipated well conditions. For example, for a flow rate of two gallons per day of oil, a 4,000 foot well might start with 1,500 feet of 0.069" inner diameter tubing at the top and 2,500 feet of 0.055" inner diameter tubing on the bottom. The high pressure injection pump assures that the surface pressure will never go negative, even if the well productivity or other conditions are unknown or changing. Thus, there is a continual but limited flow of oil through the unit and into the well bore. The injection pump at the surface can be used in place of the electric submersible pump downhole oil reservoir. The oil that is supplied to the motor by the capillary tube system is injected directly into the motor head. Internal passages in the motor head introduce the fresh oil directly to the pothead or electrical connection cavity, which is the most failure prone area of the electrical system.

11 Claims, 3 Drawing Sheets

LOW FLOW RATE OIL SUPPLY SYSTEM FOR AN ELECTRIC SUBMERSIBLE PUMP

BACKGROUND OF THE INVENTION

This invention relates generally to electric submersible pumps and more particularly concerns systems for supplying oil to such pumps during downhole operation.

The upper operating temperature for an electric submersible pumping system is limited by the degradation of the motor oil and the motor insulation due to temperature and by the ability of the thrust bearing to function at elevated temperatures. It has long been recognized that a continuous fresh oil supply increases the life expectancy of the unit. Present oil feed systems depend on the use of complex, surface controlled, pressure balancing and metering systems and require specially developed sub-surface pressure regulating valves that operate at elevated temperatures in the well fluid. These complex regulating systems are used because of the difference in the height of the column of fluid in the well bore and the height of the column in the oil supply tubing, which could amount to several thousand feet. The motor and the seal system could not handle the pressure that this fluid level differential represents. Even if they could, the volume of oil required if oil was allowed to flow freely would be cost prohibitive. In normal operation, the electric submersible pump motor oil is contained in a closed system. The expansion of the motor oil when the motor comes up to operating temperature is offset by storage in a reservoir and is returned to the system when the motor is shut down. On the initial start, the excess oil is vented to the well bore. Such a system typically requires a quarter inch inner diameter tube extending some three to six thousand feet downhole to the motor. In a free flow condition, several barrels of oil per day flow to the motor. This translates into thousands of dollars a day just for the oil necessary to keep the system running.

A further problem with the present fresh oil supply systems is that the oil is introduced at a bellows below the motor with the oil then passing upwardly through the motor and being released at a relief port at the top of the motor. This reduces the effectiveness of the oil by the time it reaches the pothead cavity which is the most likely breakdown point in the system.

It is, therefore, an object of this invention to provide an oil supply system for an electric submersible pump which eliminates the need for a downhole pressure regulator. It is a further object of this invention to provide an oil supply system for an electric submersible pump in which the continuous flow of oil is limited to less than ten and preferably to approximately one to five gallons of oil per day. Another object of this invention is to provide an oil supply system for an electric submersible pump which does not require a downhole oil reservoir. It is also an object of this invention to provide an oil supply system for an electric submersible pump in which the oil is introduced to the pump motor at the pothead cavity.

SUMMARY OF THE INVENTION

In accordance with the invention, an electric submersible pumping system is provided using a small diameter capillary tube and a high pressure injection pump. The tube size is selected so that the frictional flow resistance of the tubing at the desired volumes balances the pressure caused by the height difference in the columns of fluid. The flexibility of the system is expanded by tapering the capillary tubing string, preferably, but not necessarily, using a larger inner diameter tube above and a smaller inner diameter tube below. Using calculated lengths of different diameter tubing, the pressure loss due to flow can be adjusted to suit the anticipated well conditions. For example, for a flow rate of two gallons per day of oil, a 4,000 foot well might start with 1,500 feet of 0.069" inner diameter tubing at the top and 2,500 feet of 0.055" inner diameter tubing on the bottom. The high pressure injection pump assures that the surface pressure will never go negative, even if the well productivity or other conditions are unknown or changing. Thus, there is a continual but limited flow of oil through the unit and into the well bore.

This system has several other special advantages. The injection pump at the surface can be used in place of the electric submersible pump downhole oil reservoir. When the well and the flow through the capillary tube to the motor has stabilized, the injection pump is shut off. But the injection pump can be set to come on when the electrical submersible pump is shut down and to pump at a rate that is slightly faster than the rate or the oil contraction in the electric submersible pump. This eliminates the need for the downhole reservoir and prevents the electric submersible pump from pulling in well fluid when it is shut down. Finally, the oil that is supplied to the motor by the capillary tube system is injected directly into the motor head. Internal passages in the motor head introduce the fresh oil directly to the pothead or electrical connection cavity, which is the most failure prone area of the electrical system. The flow of the fresh oil through the motor head and then through the sealing chamber not only provides fresh oil to the pressing problem area but also continually flushes the system to remove any water that has seeded through the shaft seals.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
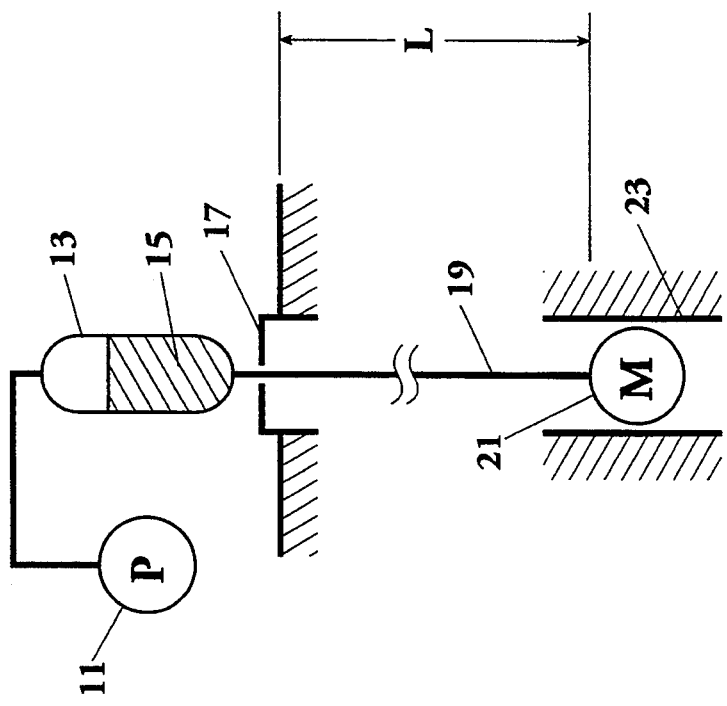
FIG. 1 is a block diagram illustrating the oil supply system in relation to its surrounding environment.
Figure 6:
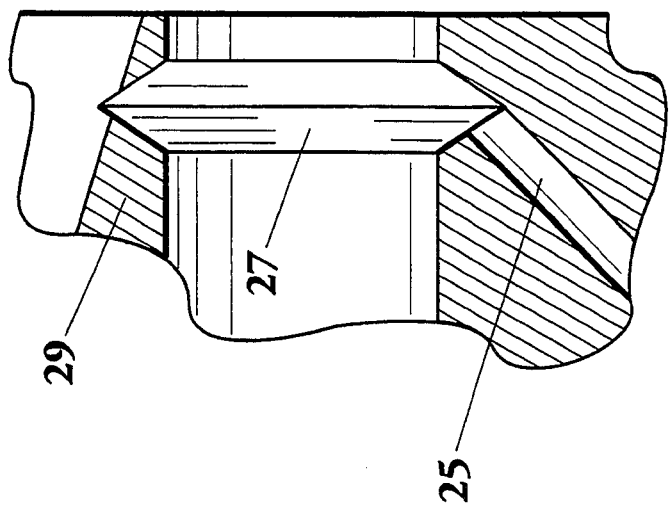
FIG. 6 is an enlarged partial elevation view illustrating the connection of FIG. 5.

A preferred embodiment of a low flow rate oil supply system for an electric submersible pump is illustrated in FIG. 1. The system includes a positive displacement pump 11 connected to an oil reservoir 13 containing oil 15 to be delivered through a well head 17 via a capillary tubing 19 to an electric submersible pump motor 21 at the bottom of a well 23. The temperature $T_s$ and pressure $P_s$ at the well head 17 or surface, the temperature $T_m$ and the pressure $P_m$ at the motor 21 and the distance L from the well head 17 or surface to the motor 21 can all be measured.

To calculate the diameter or diameters D of the tubing 19 which will allow the fluid or oil 15 to flow down the well 23 at a desired flow rate Q, all contributing components are represented as pressures and summed to find the total differential pressure across the length L of the tubing 19. The relevant components are the surface pressure $P_s$ at which fluid is injected into the tubing 19, the casing pressure $P_c$ at the well head 17, the friction pressure $P_f$ necessary to overcome the friction in the tubing 19, the fluid pressure over the pump $P_p$ generated by the column of fluid over the bottom end of the tubing 19 and the depth pressure $P_h$ exerted by the height of the column of fluid in the tubing 19.

For the energy balance to be correct, the sum of all these components must equal zero or, for this steady state system, the sum of all components adding pressure to the system must equal the sum of all components requiring pressure. This may be stated as:

$$P_s + P_h = P_f + P_c + P_p$$

The casing pressure $P_c$ and surface pressure $P_s$ are measured directly in psi. The pressure from the fluid over the pump $P_p$ and the depth pressure $P_h$ are calculated as the height of the fluid column times the density d of the fluid 15. The pressure represented by the tubing friction $P_f$, however, is not so easily determined.

The pipe flow equations for Newtonian fluids relates the friction pressure $P_f$ to tube length L, fluid flow rate Q, tube diameter D, fluid density d and fluid viscosity v. Several equations are used, each one for a specific flow regime as defined by the Reynolds Number Re. For laminar flow where Re<2100, the Hagen-Poiseuille equation is used:

$$Q = \frac{\pi \cdot P_f \cdot D^4}{128 \cdot L \cdot v}$$

For turbulent flow, where 4,000<Re<100,000, the empirical Blasius equation is used:

$$Q = 2.26 \cdot \left(\frac{P_f}{L}\right)^{4/7} \cdot (d^3 v)^{-1/7} \cdot D^{19/7}$$

Figure 2:
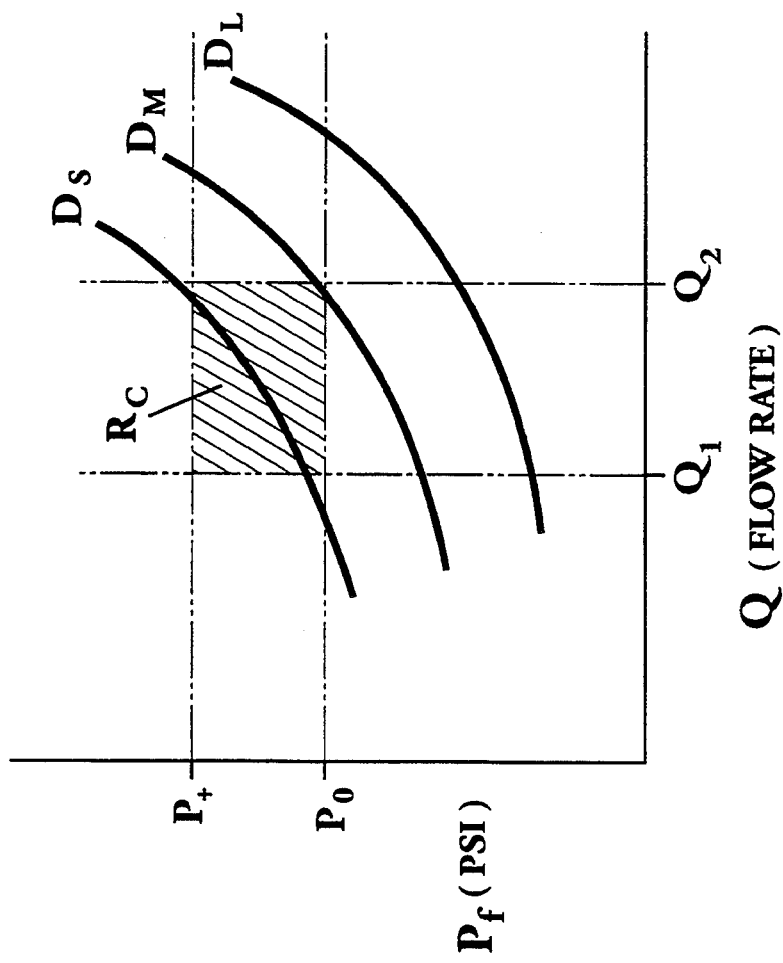
FIG. 2 is a graphic diagram illustrating the selective process in determining an appropriate inner diameter of a capillary tube for use in the oil supply system.

If the other factors were constant, the tubing diameter D could be determined by solving the component summation equation for the friction pressure $P_f$ and substituting that into the appropriate pipe flow equation. But the temperature of the well varies with the depth so consequently the viscosity v of the oil 15 is constantly changing. Because the temperature and consequently the viscosity v of the fluid 15 is changing, and the diameter of the tubing 19 may also be changed in the course of its run, the solution is not so simple. However, using a digital computer, the problem can be simplified by dividing the tubing 19 into a number of finite lengths. The flow equations are then applied to determine pressure drops over these finite lengths. The pressure drop across the total length L of the tubing 19 is then approximated by summing the smaller pressure drops across the finite lengths. This allows for complex temperature gradient representations and variations in the diameter D. In this method, while the solution for the pressure drop $P_f$ is explicit, the flow rate Q is not. The flow rate Q is therefore assumed and the surface pressure calculated. The results are plotted by the computer as illustrated in FIG. 2 and selection of the desired tubing diameter D made accordingly.

As an example of the method of determining the diameter or diameters D of the sections of tubing 19 that would produce a desired flow rate of fluid $Q_d$, a desirable range of flow rates $Q_1$-$Q_2$ within acceptable proximity to the desired flow rate $Q_d$ is selected. In addition, a desirable range of positive surface level operating pressures ranging from $P_0$ or atmospheric pressure to a positive pressure $P_+$ is selected. The overlapping regions of the desirable range of flow rates $Q_1$-$Q_2$ and positive surface level operating pressures $P_o$-$P_+$ define a region of choice $R_c$ of acceptable corresponding system flow rates Q and positive surface level operating pressures $P_f$. These flow rates Q and operating pressures $P_f$ are then applied to the above equations to determine what inner diameters D of pipe or tubing 19 most suitably fall within region of choice $R_c$. Having plotted the characteristics of several diameters of pipes or tubing 19, such as a small diameter pipe $D_s$, a medium diameter pipe $D_m$ and a large diameter pipe $D_l$, an appropriate pipe diameter D can be selected to achieve the desired flow rate Q. As illustrated in FIG. 2, the most suitable tubing diameter D to provide the desired flow rate $Q_d$ would be the small diameter pipe $D_s$. The medium diameter pipe $D_m$ could only provide desirable flow rates Q at very low positive surface level operating pressures $P_f$, and the large diameter pipe $D_l$ cannot provide a desired flow rates $Q_d$ under any desirable range of pressures $P_f$.

Figure 4:
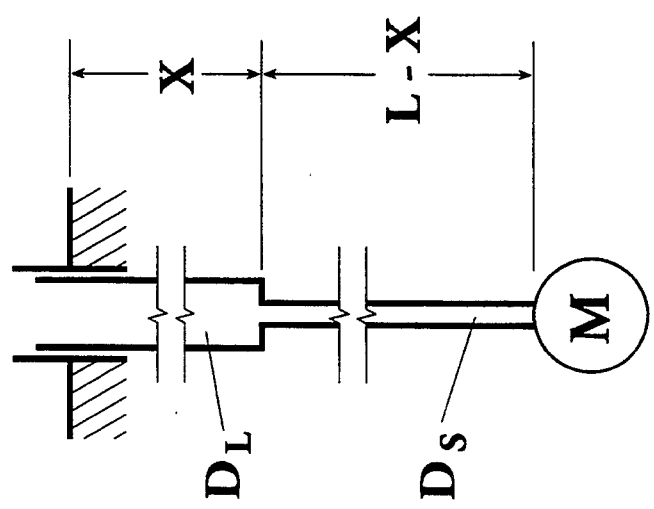
FIG. 4 is an elevation view illustrating a tapered capillary tube.
Figure 3:
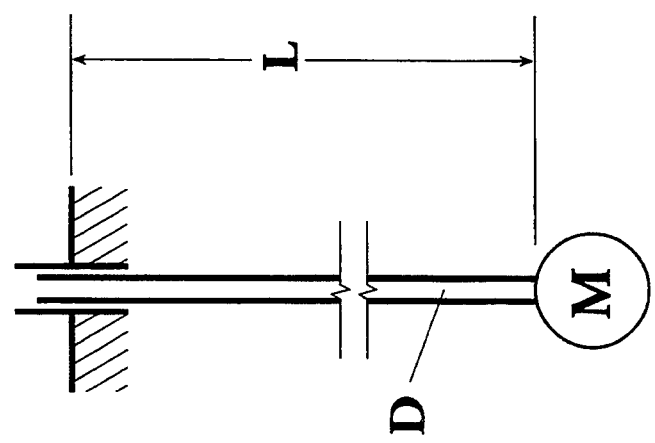
FIG. 3 is an elevation view illustrating the uniform diameter capillary tube.
Figure 5:
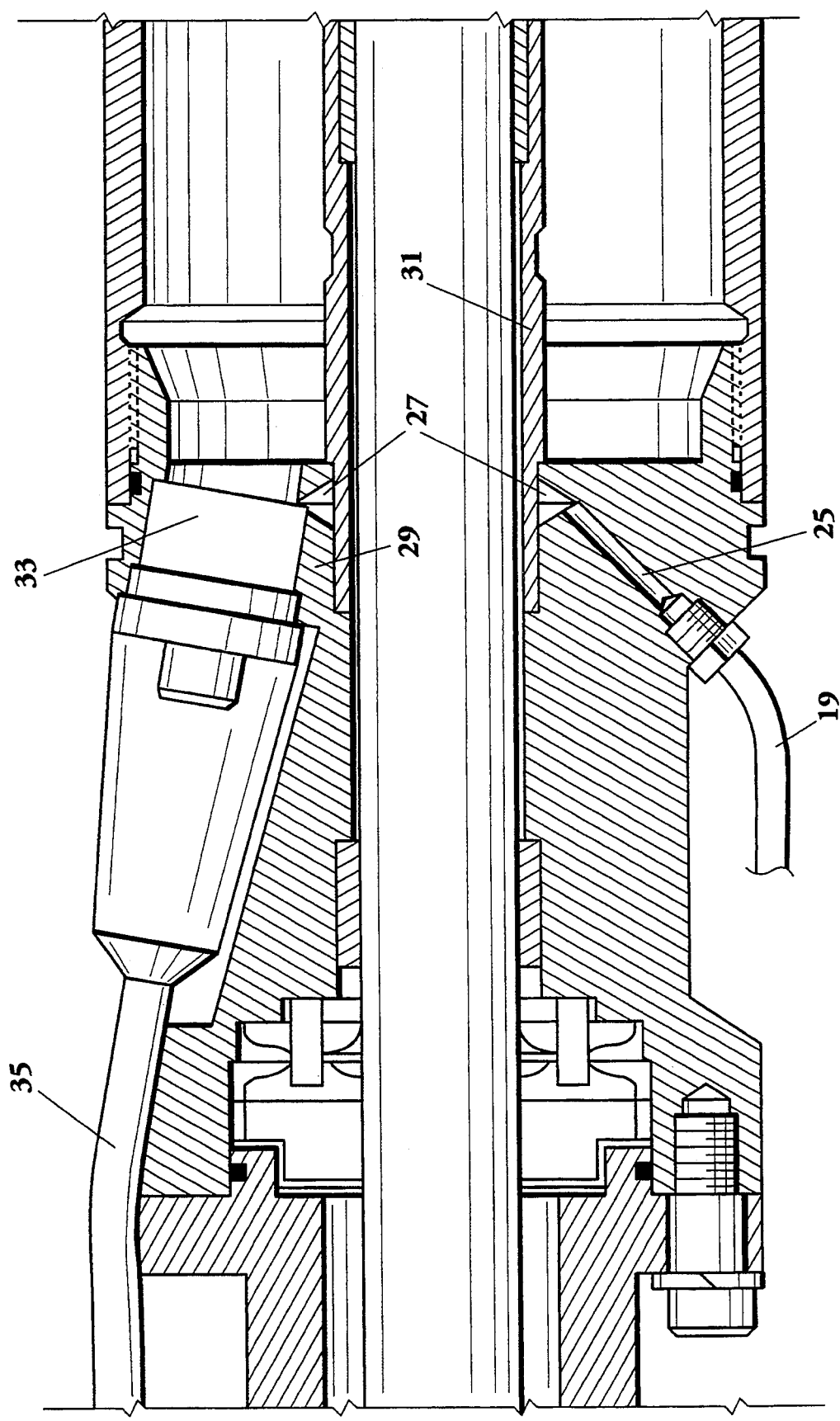
FIG. 5 is an elevation view with parts broken away illustrating the connection of the capillary tube to the pothead cavity of the pump motor.

As illustrated in FIG. 3, the tubing 19 may consist of a length L of tubing of uniform diameter. On the other hand, as shown in FIG. 4, the diameter of the tubing 19 can be tapered or decreased from top to bottom so that the upper portion of the tubing 19 has an inner diameter which is larger than the inner diameter of the lower portion of the tubing 19. In this case, the length of the respective sections of tubing 19 may be represented as X and L-X, the length and diameters thus defined being applied incrementally in the equations above given. While it is most preferable that the taper of the tubing 19 such that smaller diameter tubing lies below longer diameter tubing, any pattern of increasing and decreasing diameter tubing can be employed.

In the practice of this invention, it is desirable that the capillary tube 19 be connected to the pump motor 21 through a communication hole 25 through an inner diameter groove 27 which is cut in the motor head 29 before the bushing tube 31 is pressed into the motor head 29. The groove 27 intersects the pothead terminal cavity 33 which receives the motor head cable 35. Thus, the oil 15 flowing through the capillary tube 19 is delivered directly to the pothead terminal cavity 33 where it is most needed.

Preferably, the positive displacement pump 11 would be selected to provide pressures ranging from 0 to 5,000 psi.

Thus, it is apparent that there has been provided, in accordance with the invention, a low flow rate oil supply system for an electric submersible pump that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A low flow rate system for supplying oil from a ground surface level to a downhole electric submersible motor comprising:
   a downhole electric submersible motor;
   a high pressure injection pump situated at said ground surface level; and
   a capillary tube hydraulically connecting said downhole submersible motor to said injection pump, said tube having a diameter calculated to produce a predetermined rate of flow of oil.

2. A system according to claim 1, said rate of flow being in the range of 1 to 10 gallons per day.

3. A low flow rate system for supplying oil from a ground surface level to a downhole electric submersible motor comprising:
   a downhole electric submersible motor;
   a ground surface level high pressure injection pump; and
   a capillary tube hydraulically connecting said downhole submersible motor to said ground surface level injection pump, said tube having an inner diameter determined by a digital computer based upon:
   a desirable range of rates of oil flow through said system;
   a desirable range of positive surface level operating pressures;
   the flow/pressure characteristics of at least one inner diameter of said tube; and
   an inner diameter of said tube which provides said desirable range of rate of oil flow at said desirable range of positive surface level operating pressure.

4. A system according to claim 3, said tube being of uniform inner diameter along the length thereof.

5. A system according to claim 3, said tube comprising a plurality of sections of tube serially connected, at least one of said sections having an inner diameter different than an inner diameter of another of said sections.

6. A system according to claim 3, said tube comprising a plurality of sections of tube serially connected, each said section having an inner diameter less than an inner diameter of any higher section.

7. A system according to claim 3, said tube being hydraulically connected to a pothead cavity of said motor of said downhole pump.

8. A system according to claim 7, said system having a hydraulic path extending sequentially through said surface pump, said tube, said pothead cavity and said motor prior to expulsion from said system.

9. A low flow rate system for supplying oil of viscosity v from a ground surface level at temperature $T_s$ over a distance L to a downhole electric submersible pump at temperature $T_m$ in a well having a productivity rate $R_p$ at a flow rate Q comprising:
   a downhole electric submersible pump;
   a ground surface level high pressure injection pump; and
   a capillary tube hydraulically connecting said downhole submersible pump to said surface level injection pump, said tube having an inner diameter D determined by the factors of:
   a desirable range of rate of oil flows $Q_1$-$Q_2$ through said system;
   a desirable range of positive surface level operating pressures $P_0$-$P_+$; and
   the plotted flow-pressure characteristics of a plurality of inner diameters of said tube according to the equations:

$$P_s + P_h = P_f + P_c + P_p;$$

$$Q = \frac{\pi \cdot P_f \cdot D^4}{128 \cdot L \cdot v};$$

$$Q = 2.26 \cdot \left(\frac{P_f}{L}\right)^{4/7} \cdot (d^3 v)^{-1/7} \cdot D^{19/7},$$

where
   $P_s$ is the pressure at which oil is injected into said tubing;
   $P_h$ is the pressure exerted by the height of oil columns in said tubing;
   $P_f$ is the pressure necessary to overcome friction in said tubing;
   $P_c$ is the casing pressure at the well head; and
   $P_p$ is the pressure over the pump generated by the column of oil over the bottom end of said tubing; and wherein
   said inner diameter D of said tube which provides said desirable range of rate of oil flows $Q_1$-$Q_2$ at said desirable range of positive surface level operating pressures $P_0$-$P_+$.

10. A system according to claim 9, said tube being of uniform inner diameter along the length thereof.

11. A system according to claim 9, said tube comprising a plurality of sections of tube serially connected, each lower one of said sections having an inner diameter less than an inner diameter of any higher section, the inner diameter D and length L of each section being determined according to said equations.

* * * * *